June 6, 1950 H. G. BUSIGNIES ET AL 2,510,065

BEACON SYSTEM

Filed July 31, 1945 4 Sheets-Sheet 1

INVENTORS
HENRI G. BUSIGNIES
PAUL R. ADAMS
ROBERT I. COLIN

BY

[signature]
ATTORNEY

BEACON SYSTEM
Filed July 31, 1945 4 Sheets-Sheet 2
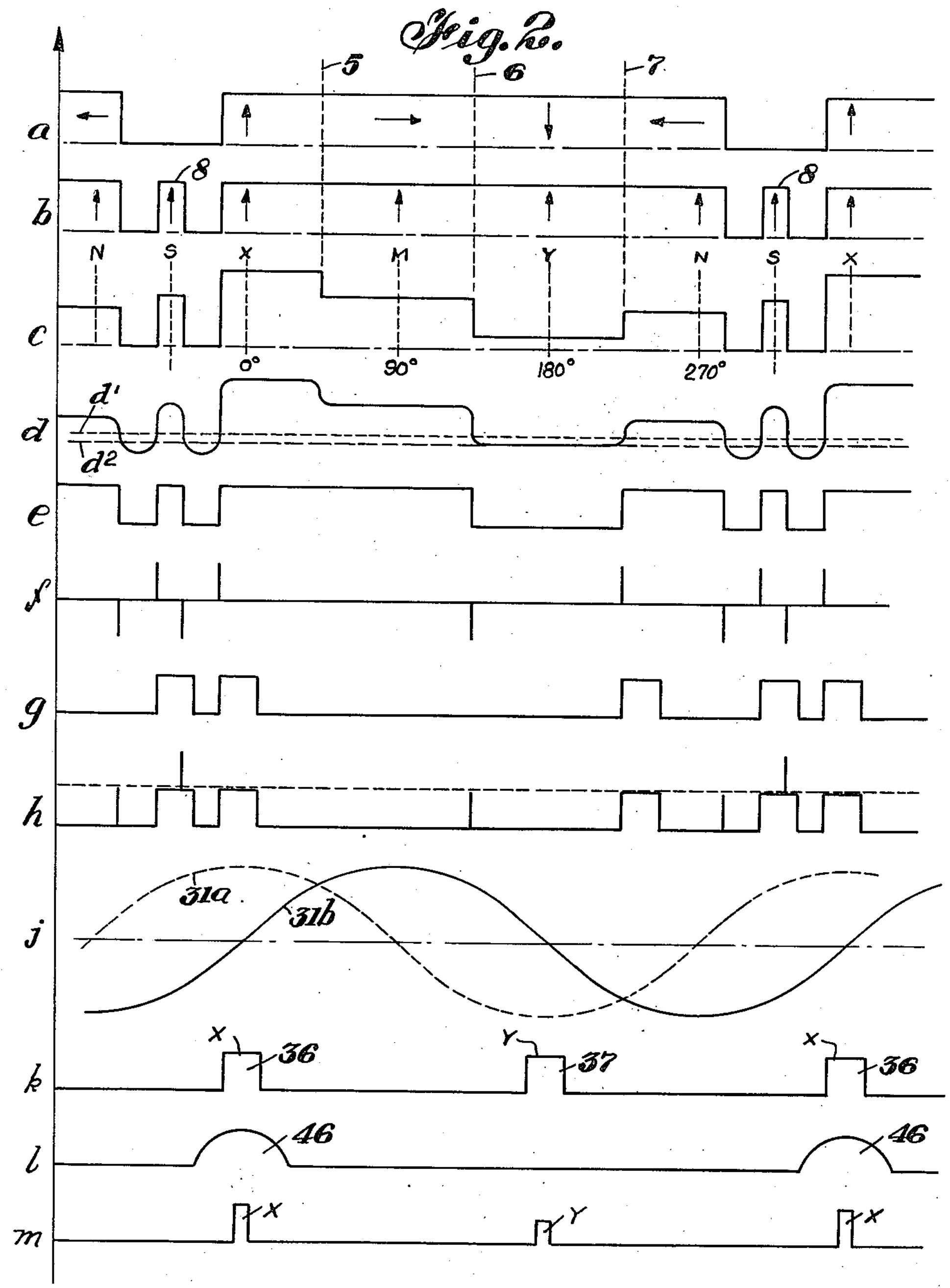
INVENTORS
HENRI G. BUSIGNIES
PAUL R. ADAMS
ROBERT I. COLIN
BY
R. P. Morris
ATTORNEY

BEACON SYSTEM

INVENTORS
HENRI G. BUSIGNIES
PAUL R. ADAMS
ROBERT I. COLIN
BY
R.P. Morris
ATTORNEY BEACON SYSTEM
Filed July 31, 1945 4 Sheets-Sheet 4
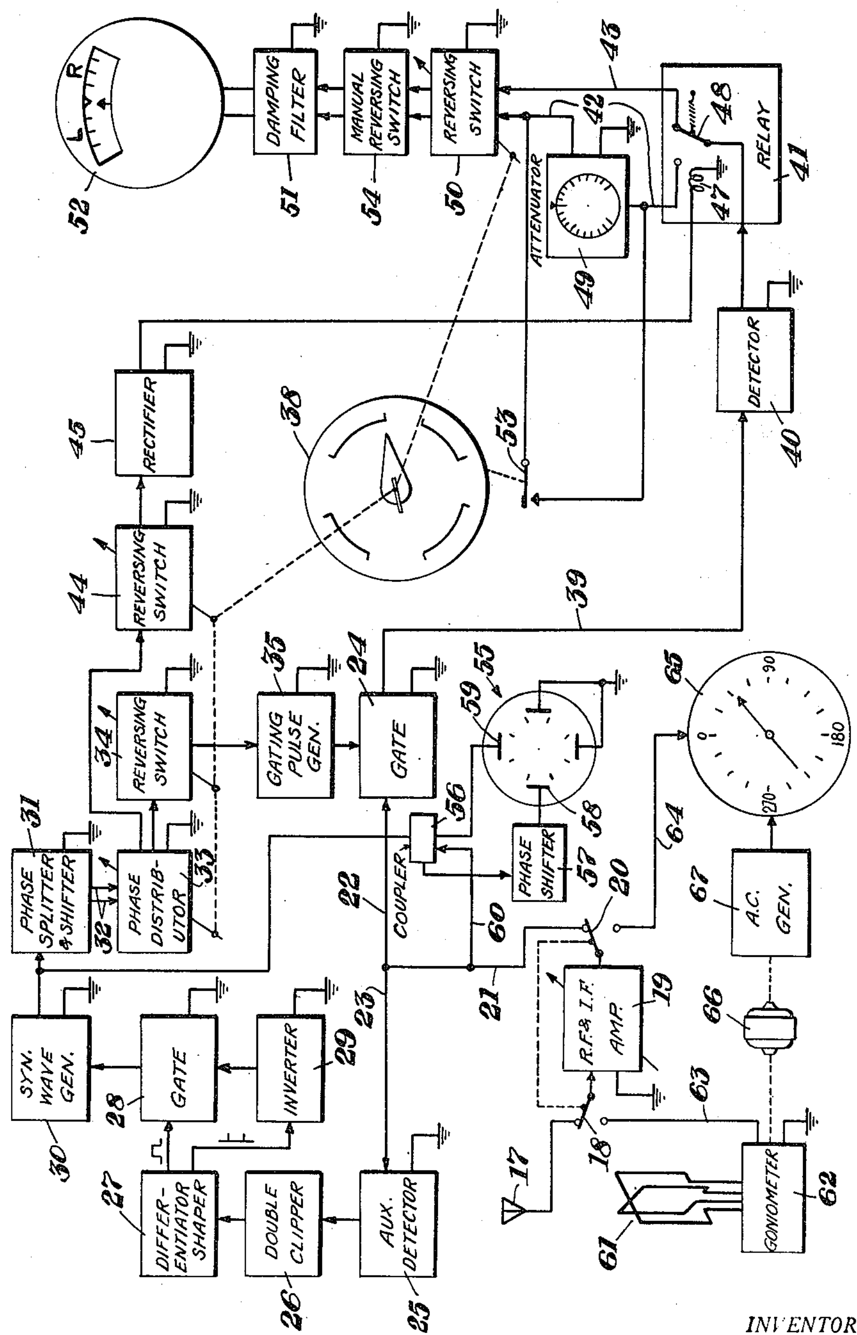
INVENTORS
HENRI G. BUSIGNIES
PAUL R. ADAMS
ROBERT I. COLIN
BY
R P Morris
ATTORNEY Patented June 6, 1950

2,510,065

UNITED STATES PATENT OFFICE 2,510,065

BEACON SYSTEM

Henri G. Busignies, Forest Hills, N. Y., Paul R. Adams, Cranford, N. J., and Robert I. Colin, Far Rockaway, N. Y., assignors to Federal Telephone and Radio Corporation, New York, N. Y., a corporation of Delaware Application July 31, 1945, Serial No. 607,983

27 Claims. (Cl. 343—102)

1

This invention relates to radio beacon systems and more particularly to radio beacon systems designed for use over long distance ranges.

For long range navigation, particularly for guiding aircraft over routes crossing oceans, it is desirable that radio beacon systems be provided which are reliable in operation so that the schedule of travel may be maintained substantially all of the time. Because of the long stretches between land bases across the oceans, it is essential that such systems have a range of 1500 miles or more. For the usual radio range beacon, it has generally been considered more suitable to use relatively short waves. However, because of the mechanism of short wave propagation on transmission over long distance transmission and the varying states of the ionosphere, it is difficult to provide a short wave system to meet the universal time, direction and distance requirements. Such short wave stations would require a minimum of three different frequencies to assure reliability of operation over the various distance ranges. Furthermore, the short wave transmissions are subject to violent and rapid fading and are particularly subject to error when loop direction finders are used as the pick-up. One serious fault of the shorter radio waves is the lack of reliability of service over long distances because of the susceptibility of these short wavelengths to complete fade-outs of relatively long duration which appear to be associated with the cycles of solar and magnetic activities. Because of this factor, a high degree of continuity of waves appears to be unobtainable at these shorter wavelengths unless antenna powers of thousands of kilowatts are used. Power requirements for such systems are clearly impractical.

At the low and very low frequencies, on the other hand, the transmission is relatively stable. The variations are generally relatively slow and not extreme. There are no complete fade-outs of these longer wavelengths during periods of solar activity nor are there skip distance effects requiring the use of several frequencies at the transmitter. For a network of beacons a single low frequency could be used for each ground station. In spite of the greater simplicity of long wave beacons, these have not hitherto been considered preferable to short wave beacons because at ordinary band widths and practicable powers the percentage of drop outs in reception of short waves is on the average lower than with long waves for the same power fed to the antenna. At extremely high powers (of the order of a hundred thousand watts average power for 1500

2 miles distant) this disadvantage of the long waves is less pronounced so that the long waves are approximately as reliable as the short waves for equal power applied to the antenna. This might lead one to expect that at still larger powers the long waves would give better reliability than the short waves for the same antenna feed power, but the utilization of such still larger powers for 1500 mile coverage has not been considered reasonable. For telegraphy and telephony, moreover, these powers are not economically justified since much lower powers will give 90% or 95% continuity of service. The trend in such services has therefore been toward short waves which give best continuity for moderate power.

In the case of a beacon for long range navigation, the seriousness of even 1% drop outs is so great that we must look for a system having about 99.9% reliability. Ignoring temporarily the impracticability of handling many megawatts of power in a long wave type of antenna, it appears from extrapolation of known data that for fifteen million watts average power fed to an antenna a suitably long wave system would give less drop outs than a short wave system. Thus, it appears that at these enormous powers the curves will have crossed so that for the same power the long waves now give less drop outs instead of more.

Of course, these tremendous powers could not be actually realized but by narrowing the band width far below that usually employed, it is possible to produce with 50 kilowatts the same great signal-to-noise ratio as if the power were many times greater. This great signal-to-noise ratio then gives the same anomolous inversion of long and short waves in respect to their percentages of drop outs.

It is one object of the present invention to make use of such high powers (in relation to the distance to be covered) and such narrow band widths that the signal-to-noise ratio is many times higher than hitherto employed and to take full advantage of this increased signal-to-noise ratio by using long waves (40 to 150 kc.) in view of the discovery that at high signal-to-noise ratios the long waves have a lower percentage of drop outs than the short waves.

In particular it is an object to employ such high powers and such narrow band widths that at 1500 miles the average ground wave is comparable with the average atmospheric noise level and to make use of long waves (of about 80 kc.).

Because of the reliability and simplicity of radio beacons operating at these low frequencies, they are considered to be particularly suitable for long distance aerial navigation systems providing a high degree of continuity of waves with reasonable antenna powers. In order, however, to keep the power low and the effective reliability at a high level, we have found that it is desirable to provide a signaling system which will introduce side bands of very low frequency variation. For example, the carrier of the low frequency range should preferably be under 200 kilocycles and the modulation should not provide a range of frequency of more than ±300 cycles per second. For cooperation with beacon, the receiver should have a narrow band width of not over ±60 cycles per second to provide a relatively high signal-to-noise ratio.

It is an object of our invention to provide a radio beacon system operating in the low frequency range and having modulation signals which are of very low frequencies.

It is a further object of our invention to provide a radio beacon system for use over long ranges wherein the carrier frequency is maintained below a 200 kilocycle level and the essential modulation frequency is maintained substantially under ±60 cycles per second, used in cooperation with narrow band selective indicating receivers.

For low frequency beacon systems of a type outlined above, the usual type of omnidirectional beacon cannot easily be adapted since this type of beacon requires generally modulation frequencies of higher order to provide the desired different signals for different directions. Therefore, in accordance with our invention, we prefer to use a simple radio beacon consisting of spaced antenna elements together with means for supplying energy to these units at relatively different phase to provide different directive distribution patterns. Preferably, the phasing of the energy in the two antennas is varied between zero phase difference and 180° phase difference cyclically and at a sufficiently low rate of change to maintain the side bands at relatively low frequency levels. The phase shifting may be continuous but in the simplest form we provide a system in which the phase varies in steps, for example four steps, 0, 90, 180 and 270. This phase variation may take place over relatively long periods of time, the entire cycle taking place, for example, in one or two minutes. Preferably, we also provide a timing or synchronizing pulse intermediate each cycle during which period the power radiated reduces to zero in both antennas and permits the transmission of a pulse from one of the antennas. This four-stepped phase shift, as outlined, provides six equi-signal courses and permits courses to be followed intermediate these equi-signal courses by measuring the ratio of energy between two of the switching cycles. The switching cycles to be compared will differ in different azimuthal directions and for this reason the synchronizing or timing signal is useful in order that the receiver circuit may be timed properly to receive the desired signals for comparison. This radio system, as described broadly above, will provide indications of courses with quadrant identification except for a region of about 20° variation about the ends of the line interconnecting the antennas. In these regions, however, if more than one beacon is provided, the ambiguity may be resolved by tuning to a second beacon to get a proper phase indicating quadrant. Moreover, direction finder equipment may be operatively associated with the beacon receiver and the position of the receiver with respect to the beacons determined by direction finder triangulation if desired.

It is a still further object of our invention to provide a radio beacon system wherein energy is transmitted cyclically at different amplitude levels in different sectors about the beacon and receiver means is provided for selecting, in time, energy of two different levels and comparing these energies to indicate azimuth.

It is a still further object of our invention to provide a receiver, for use with a radio beacon of the type propagating energy successively and cyclically in differently directed radiation patterns, in which means is provided to select portions of energy from two of the patterns and compare the energy to indicate the azimuth position of the receiver with respect to the beacon.

It is a still further object of our invention to provide a radio beacon system and receiver therefor in which there is provided a beacon indicator responsive to received energy for indicating the beacon course position of the receiver and a direction finder antenna associated with the receiver and with a direction finder indicator for alternative indication of direction.

While we have outlined briefly the principles of our invention and the objects and features thereof, a better understanding of these features and of these and other objects of the invention may be had from the particular description of a specific embodiment thereof made with reference to the accompanying drawings, in which:

Fig. 2 is a graphical representation of the energization cycles used in explaining the operation of the various parts of the system;

Fig. 5 is a schematic block circuit diagram of a receiver in accordance with our invention.

Figure 1:
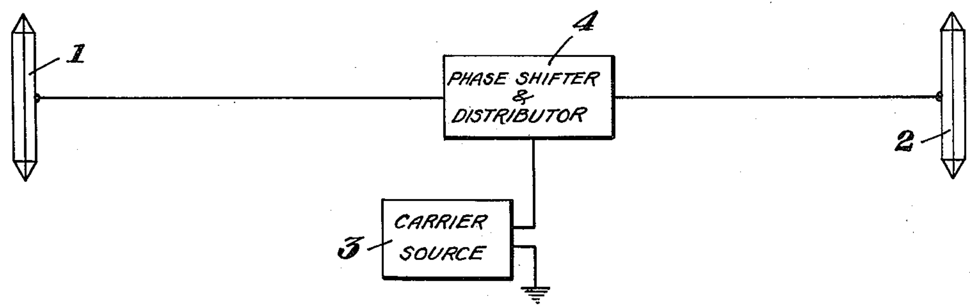
Fig. 1 is a schematic block circuit diagram of a radio beacon transmitter.

Turning first to Fig. 1, two long wave radiating antennas are shown at 1 and 2 spaced apart preferably a half wavelength. A source of carrier frequency energy is shown at 3, preferably a source within the frequency range of from 40 to 150 kilocycles. A phase shifting network system 4 is provided for varying the relative phase of energy supplied from source 3 to antennas 1 and 2 in predetermined steps. For purposes of illustration, the phase adjusting system 4 may comprise electronic or capacitive switching means associated with antennas 1 and 2 which will energize the antennas in different phase relationship. A simple form of system wherein the antennas are successively energized in different phase in four steps starting 0°, 90°, 180° and 270° phase difference respectively, is used as illustrative. Intermediate this phasing cycle, one of the antennas only is energized to produce a synchronizing or timing pulse for use in the receiver as will be clear later in the description.

Turning now to Fig. 2, curve *a* represents the energization of antenna 1 and curve *b* the energization of antenna 2 for the cycle of operation of the system. The arrows in curves *a* and *b* represent the relative phases of energy in the two antennas and the dotted lines 5, 6 and 7 of curve $a$ represent the transition points of the phase changes. It will be seen that intermediate each cycle of operation, timing or synchronizing pulses 8 are transmitted as shown in curve $b$. At some azimuth angle with respect to the center of radiation of the beacon, the energy which may be received is represented in curve $c$. It will be seen that this signal comprises a synchronizing pulse 8 provided with gaps on both sides thereof followed by a section wherein the zero phase is effective, designated by the broken line X. Another period when the 90° phase energy is effected represented by the line M, another period during which the 180° energy is effected represented by the letter Y and another period represented by the letter N during which the 270° energy is effected. While in the curves we have illustrated the signals as abruptly rising from one value to another, it should be understood that circuit 4 is preferably designed to provide a rounding of the curves or gradual transition from one state to another to avoid high frequency side bands. It is desirable that substantially all the side band energy be confined within ±300 cycles per second, and preferably within ±80 cycles per second, but the cycles should be so chosen that the essential information be confined with ±60 or preferably ±10 cycles per second.

Figure 3:
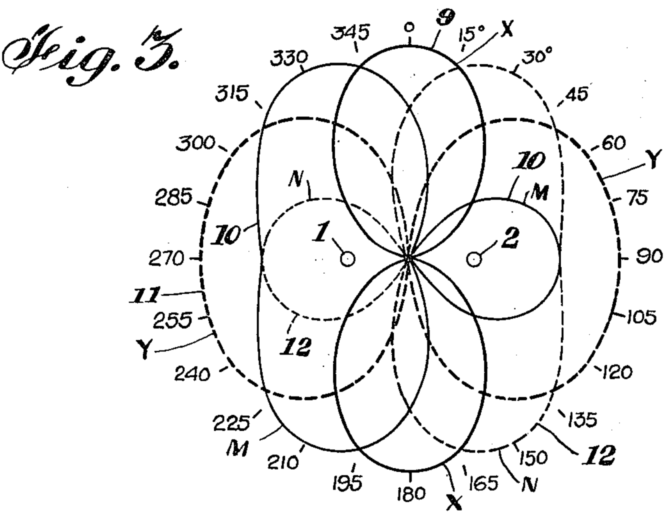
Fig. 3 is a polar diagram of the radiation patterns produced during the various cycles of operation of the transmitter shown in Fig. 1.

In Fig. 3, are shown in polar coordinates the various patterns representing the phasing positions of the rotary switches. In the position represented by X (Fig. 2) there is produced a symmetrical curve 9 represented in heavy solid lines. At the 90° position, a curve 10 represented by solid light lines is produced corresponding to the sector designated M. In curve 11 is shown in heavy dash lines the pattern represented by the switching sector Y and at 12 in light dash lines is shown the distribution produced in switching position N. It will be observed that in various sectors about the beacon, equi-signal paths may be readily determined and that by measuring the ratio of energy of certain of these patterns the departure from the equi-signal courses may be determined over a greater portion of the circumference around the beacon.

Figure 4:
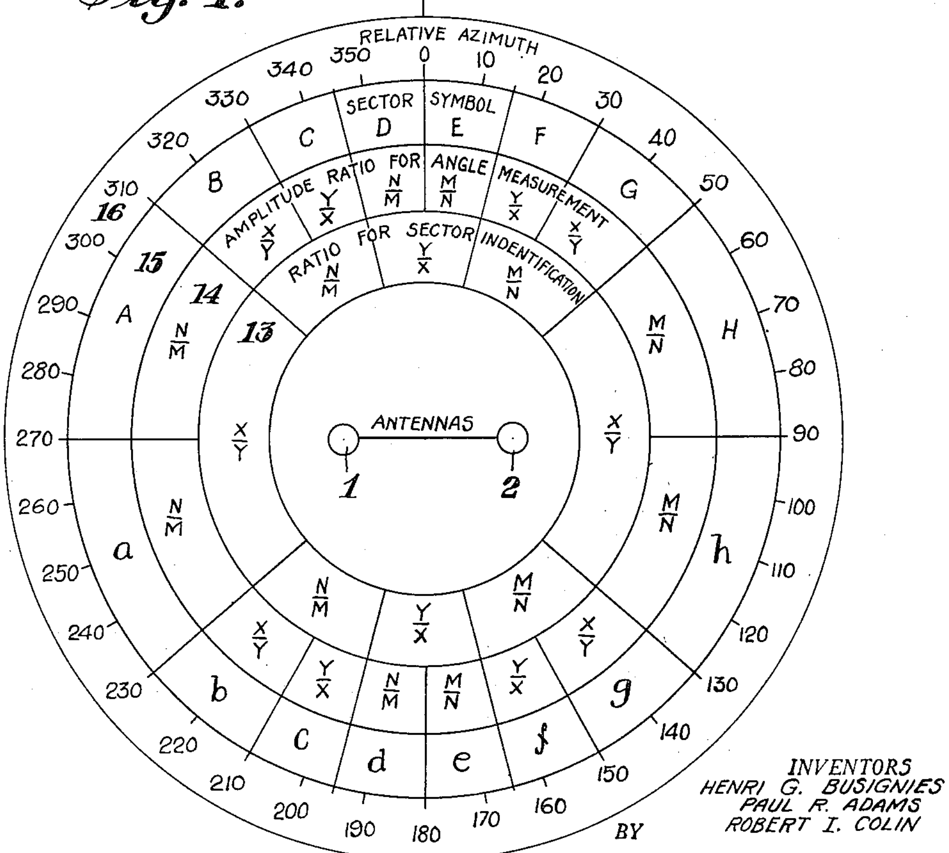
Fig. 4 is a diagram illustrating the various sectors and the signals best suited for directional comparison in these various sectors.

In order to determine which ratios to measure to determine the angular relationship of the receivers with respect to the beacon, the chart shown in Fig. 4 may be used. If we consider in every instance the ratio to be measured is such that the amplitude is always less than unity, then the sector identification may be derived by measuring the ratios of energies $$\frac{M}{N}, \frac{X}{Y}, \frac{Y}{X} \text{ and } \frac{N}{M}$$

as indicated in the inner concentric ring 13. The amplitude ratio for measurement of the angle may be taken as a ratio of these same energies in accordance with the showing in the next concentric ring 14. It will be noted here that except in small sectors adjacent the line defined by antennas 1 and 2, the amplitude ratios for angular measurement and the ratios for sector identification differ so that ambiguities may be overcome. The various sectors are designated by separate symbols A to H inclusive, and $a$ to $h$ inclusive, as shown in the circle 15 while the angles about the beacon are designated in the outer circle 16.

In Fig. 5 is shown a receiver circuit for cooperating with the radio beacon of Fig. 1. Referring again to Fig. 3, it will be noted that there are four directions (30°, 150°, 210°, 330°) along which the signals corresponding to X and Y of Fig. 2 are of equal amplitude and two directions (0°, 180°) along which the M and N signals are of equal strength, a total of six equisignal directions. However, the system will also produce other courses in almost all of the other directions. This is accomplished in the receiver by determining the ratio of the X and Y amplitudes or the M and N amplitudes.

In Fig. 5, the receiving antenna 17 is coupled through switch 18 to the radio frequency and intermediate frequency amplifier circuit 19. Receiver 19 is preferably tuned to receive signal energy confined to a relatively narrow side band reception on either sides of the low frequency received cycle. Preferably, the receiver is designed to receive side bands up to only ten cycles or less on opposite sides of the carrier frequency, although the acceptance band may be expanded to 30 cycles per second or even ±60 if desired. By confining the side band energy to a relatively narrow band, further improved signal-to-noise ratio is obtained.

The output from amplifier 19 is supplied over switch 20 and conductor 21 to branch lines 22 and 23. Branch line 22 supplies the received energy to a gate circuit 24 which is normally blocked to the passage of the energy. This gate circuit, however, is unblocked for predetermined portions of the cycle to pass selected portions of the received energy through to the indicators when desired.

The received radio frequency energy may be represented by the curve $c$, Fig. 2. This energy, while shown with abrupt straight line changes, actually would be gradual making the curves somewhat rounded at the transition points. After passage through the narrow band receiver, however, the rounding would be greatly accentuated as shown in curve $d$. This energy may then be detected in the auxiliary detector 25 supplied with energy over line 23 so that curve $d$ of Fig. 2 may represent the envelope frequency of the detected signal. This detected signal is then passed through a double clipper circuit 26 which serves to clip the detected energy at two levels $d_1$ and $d_2$, curve $d$, Fig. 2, producing an output wave substantially in the form shown at curve $e$ of Fig. 2. A differentiating and shaping circuit 27 (Fig. 5) serves to differentiate the clipped energy producing a series of pulses of the form shown in curve $f$ of Fig. 2. The positive differentiated shaped or control pulses are then applied to a gate circuit 28 in the form of rectangular pulses of a constant width as shown in curve $g$, Fig. 2. These pulses are provided of sufficient width to substantially bridge only the synchronizing pulses 8. The differentiated unshaped pulse wave from 27 is applied to an inverter circuit 29 which inverts the pulses so that those previously appearing as negative become positive. These pulses from inverter 29 are applied to gate circuit 28 simultaneously with the control pulses directly applied from differentiator 27. As a result, only those pulses which fall within the gate opening period of the pulses of curve $g$ will pass through the gate producing an effective shown above the dotted line as illustrated in curve $h$, Fig. 2. Thus the circuit so far described will serve to select the synchronizing pulses and reject the remaining portions of the received energy. The selected pulses from gate circuit 28 are applied to a synchronized sine wave generator 30 producing a sine wave timed in accordance with the synchronizing pulses. This sine wave may be applied to phase splitter 31 producing two sine waves 31*a* and 31*b*, curve *j*, Fig. 2, offset in phase in accordance with the relative spacing of the XY and MN portions of the signal. These split phase waves are then passed over lines 32 through an adjustable phase distributor 33 which serves to adjust the phase position of control waves 31*a* and 31*b* to correspond with the different selected sectors as indicated in Fig. 4. As shown in Fig. 2 the circuit is adjusted to produce, through the action of reversing switch 34 and gating pulse generator 35, gate control pulses 36 and 37, curve *k*, Fig. 2, corresponding in position to the X and Y signals respectively. These gate control signals are then applied to gate 24 to permit energy to pass during the time intervals indicated by pulses 36 and 37. These pulses of energy will correspond to the X and Y components of the signal as illustrated. However, by adjustment of the control switch 38 the phase distributor 33 and reversing switch 34 may be adjusted to various sectors to select the desired signals whose ratio is to be compared.

The intermediate frequency energy passed through gate 24 is applied over line 39 to a receiving detector 40 and from detector 40 to switching relay 41. Switching relay 41 is controlled in timed relation with respect to the synchronizing pulses so as to apply the energy corresponding to the X signals, for example, to an output line 42 and that corresponding to the Y signals to line 43. This switching operation may be accomplished by the use of the wave 31*a* applied over an adjustable reversing switch 44, controlled by manual control switch 38, to rectifier 45, producing pulses 46, curve *l*, corresponding in position to the X pulses 36 of curve *k*. Each time a pulse 46 is applied to relay winding 47, relay contact 48 is switched from its position in connection with line 43 to a connection with line 42. It will thus be seen that the X and Y pulses are distributed between output lines 42 and 43. In line 42 is provided an adjustable attenuator device 49 so that the attenuation of the X signals, which are shown to be of greater amplitude than the Y signals, curve *m*, Fig. 2, may be adjusted so that the two signals will be of the same amplitude. These signals are applied over another reversing switch 50 controlled by the switching control 38 to a damping filter 51 and an indicating meter 52. Since it is desirable for the purposes of ratio comparisons to provide an attenuator in one line only, switch circuit 38 is arranged so that the signals of greater amplitude may be selected for application to line 42 or line 43. Thus, the ratio X:Y can be distinguished from the ratio Y:X and similarly ratios N:M and M:N may be distinguished one from another.

In order to overcome ambiguities, it is necessary to determine the sector in which the comparison meter 52 is operating as well as the amplitude ratios of the indicating energies. To accomplish this, we provide an auxiliary switching arrangement 53 which may be closed manually and serves to by-pass attenuator 49. At the same time, closing of switch 53 adjusts the selector control 38 and the corresponding phase distributor and reversing switches so that the MN signals are selected and applied to the meter 52 without attenuation. The direction of the deflection caused in meter 52 will thereby indicate the sector in which the receiver is operating. It should be clearly understood that while, in the present instance, we have shown X and Y patterns as our azimuth indicating signals and the M and N patterns as sector identification signals, selector 38 may be adjusted so that the M and N patterns are the azimuth indicating signals and the X and Y patterns the sector identifying signals.

A further manually operated reversing switch 54 is provided in the line of meter 52 so that the left, right indications may appear properly on the meter regardless of whether the plane is flying toward or away from the beacon. It is obvious that when flying away from the beacon the left, right positions will be reversed with respect to their indications when flying toward the beacon.

While, in general, the signals will be sufficiently distinct as received so that the automatic pulse selecting circuit described will readily serve for synchronizing the system, it is possible that in cases of heavy static the synchronizing pulse will not be sufficiently separated from the beacon signals for proper operation of this system. In order to take care of such emergencies, a visual display indicator 55 is provided. The output from sine wave generator 30 is applied over a coupler 56 and phase shifter 57 to the deflecting plates 58 and 59 of indicator 55. At the same time, the non-gated received energy is applied over lines 21 and 60 to amplifier 56 for application to indicator 55 so that a visual display of the received signal will be provided. The operator may then, by manual adjustment of 38 and observation of indicator 55, provide for selection of the desired signals.

While, in general, the beacon system described above will provide indications of the position of the craft along the course and may by the use of intersecting beacons indicate the approximate location of the craft, it is also desirable to provide auxiliary equipment for indicating the craft's position should the beacon signals, for some reason, become unreadable. For this purpose we provide a directional antenna 61 which may be coupled through a goniometer 62 and a line 63 to the input of receiver 19 when switches 18 and 20 are depressed to their alternative position. The output of the receiver 19 is then coupled over line 64 to a direction indicating meter 65. A motor 66 which serves to drive goniometer 62 simultaneously operates an A. C. generator 67 to apply a control wave to meter 65. By comparison of the control wave from generator 65 and the received signal, the direction of a station may be indicated. By tuning receiver 19 alternately to different stations, two direction lines may be obtained so that the position of the receiver may be calculated by known triangulation methods.

Figure 6:
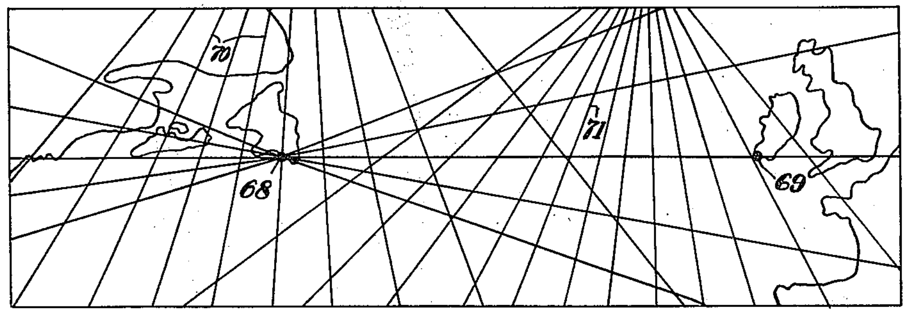
Fig. 6 is a map illustrating the use of the system.

For purposes of cross-country flying, we contemplate the provision of a plurality of different beacons spaced apart, for example, as illustrated at 68, 69 of Fig. 6. Other beacons spaced to one side of these aligned beacons 68 and 69 may produce intersecting radiations as shown at 70 and 71 respectively. It will thus be seen that a craft, for example traversing beacon courses set up by tuning 68, may be able to check his position by tuning in one of the other stations such as those transmitted signals 70 or 71. Likewise, by the use of these auxiliary beacons, ambiguities in the regions aligned with the beacon antennas may be resolved. Preferably, the pilot operating a craft in conjunction with this beacon system will be supplied with strip maps similar to the map illustrated in Fig. 6 so that he will be able readily to determine his position along the beacon course by reference to the map and the various signal indications marked thereon.

With the system above described and assuming that on the craft amplitude ratios are made from the ratio of 1:1 to a ratio .4:1 with a maximum error of one per cent, the uncertainty of any indicated angle resulting from this error in the various azimuths about the beacon is given in the table below.

[Accuracy assuming attenuator accuracy of 1%]

| Pattern | Azimuth | Angular Error | Lateral Error at— | |
|---|---|---|---|---|
| | | | 1500 Mi. | 150 Mi. |
| | | Degrees | Miles | Miles |
| M—N | 0° (180°) | 1/5 | 5.2 | .52 |
| M—N or X—Y | 15° (345°, 165°, 195°). | 1/3 | 8.7 | .87 |
| X—Y | 30° (330°, 150°, 210°). | 1/4 | 6.5 | .65 |
| M—N or X—Y | 50° (310°, 130°, 230°). | 1/2 | 13 | 1.3 |
| M—N | 70° (290°, 110°, 250°). | 5/8 | 16 | 1.6 |
| M—N | 80° (280°, 100°, 260°). | 1 1/2 | 39 | 3.9 |
| M—N | 90° (270°) | 6 | 157 | 15.7 |

It is seen that the error along the most favorable directions is substantially less than 1° and that it is no more than 1° in all directions excluding those within the 20° of the line adjoining the two antennas. In general, the beacon may be so oriented that signals within these sectors of poor definition need not be used. It is clear that for long range navigation, departures from course of the relative percentages and distances given above are not too important. Reliability of operation of the beacon is much more important for these long range operations than is sharpness of the course.

It should be clearly understood that while we have illustrated specific forms of the receiver apparatus, various different types may be readily adapted for use in accordance with the principles of our invention. Furthermore, the specific direction finder arangement illustrated herein may be changed as desired to any other well-known form. Likewise, many changes in the circuit arrangement and elements of this system will be obvious to those skilled in the art.

While we have described above a particular example and embodiment of our invention, it is to be distinctly understood that this is given merely by way of example and is not to be considered as a limitation on the scope of our invention as set forth in the objects thereof and in accompanying claims.

We claim:

1. A radio beacon system comprising a radio beacon for cyclically transmitting energy at more than two different amplitude levels in different sectors about said beacon, said amplitude levels also varying differently in ratio and timing over different sectors, and receiver means for receiving said energy, selective means in said receiver for timing the selection of energy at two different levels, and means to compare the relative amplitudes of the selected energy to indicate azimuth position of said receiver within a given sector.

2. A radio beacon according to claim 1, wherein transition time between said different amplitude levels is relatively gradual, said selective means being operative to select the energy in the intervals between transitions.

3. A radio beacon indicating method comprising cyclically transmitting energy at more than two different amplitude levels in different sectors about said beacon, said amplitude levels also varying differently in ratio and timing over different sectors, receiving said energy at an indicating point, timing the selecting of received energy at two different levels, and comparing the relative amplitudes of the selected energy to indicate azimuth position of said receiver within a given sector.

4. A radio beacon indicating method according to claim 3, wherein transition time between said different amplitude levels is relatively gradual, said selecting being made in the intervals between transitions.

5. A receiver for operation in cooperation with a radio beacon having more than two differently directed radiation patterns successively and cyclically repeated in a predetermined time interval, comprising a receiver means, separate output channels for said receiver means, means for selectively timing the application of energy from different selected cyclic portions of the transmission cycle to the output of said receiver, switch means for switching the output of said receiver to said output channels in timed relation with the successive and cyclic repetition of a pair of said radiation patterns, and means for comparing the signals of said separate output channels.

6. A receiver for operation in cooperation with a radio beacon having more than two differently directed radiation patterns successively and cyclically repeated in a predetermined time interval, whereby the energy level will be different in different directions around said beacon, comprising a receiver means, separate output channels for said receiver means, adjustable timing means for selectively timing said receiver to respond to the energy of two of said different patterns, switch means for switching the output of said receiver to said output channels in timed relation with the successive and cyclic repetition of the selected radiation paterns, and means for comparing the signals of said separate output channels.

7. A receiver for operation in cooperation with a radio beacon having more than two differently directed radiation patterns successively and cyclically repeated in a predetermined time interval to provide different signal variations and a synchronizing signal transmitted intermediate the cyclic periods, comprising a receiver means for receiving said signal variations and said synchronizing signal, separate output channels for said receiver means, a selective circuit responsive to said received synchronizing signal, selective means adjustably timed for selecting a desired pair of said received signal variations, switch means for switching the output of said receiver to said output channels in timed relation with the successive and cyclic repetition of said selected pair of said signal variations, and means for comparing the signals transmitted over said separate channels.

8. A method for providing directional indications responsive to energy from a radio beacon having more than two differently directed radiation patterns successively and cyclically repeated in a predetermined time interval in a given sector, comprising selectively timing the reception of energy corresponding to a desired pair of patterns within the cycle, switching the selected energies into different channels in timed relation with the successive and cyclic repetition of said pair of radiation patterns, and comparing the selected energies from said separate channels.

9. A radio receiver system for use with a radio beacon comprising a receiver for receiving the beacon energy, a beacon indicator responsive to received signal energy for indicating the position of said receiver relative to the course defined by said beacon, a directional receiving antenna, means for coupling said directional receiving antenna to said receiver, a direction finder indicator for indicating the direction toward said beacon in response to received energy and the effective directive position of said directional antenna, and switch means for alternatively coupling said beacon indicator and said direction finder indicator to the output of said receiver.

10. A radio receiver system for use with a radio beacon comprising a beacon receiver antenna, a receiver for receiving the beacon energy, a beacon indicator responsive to received signal energy for indicating the position of said receiver relative to the course defined by said beacon, a directional receiving antenna, a direction finder indicator for indicating the direction toward said beacon in response to received energy and the effective directive position of said directional antenna, and switch means for alternatively coupling said beacon receiver antenna and said directional receiving antenna to the input of said receiver and said beacon indicator and said direction finder indicator to the output of said receiver.

11. In a radio beacon system comprising a radio beacon for transmitting energy in cyclically different distribution patterns over a given area at a predetermined radio frequency, a receiver for receiving the beacon energy, a beacon indicator responsive to received signal energy for indicating the position of said receiver relative to the course defined by said beacon, a directional receiving antenna, means for coupling said directional receiving antenna to said receiver, a direction finder indicator for indicating the direction toward said beacon in response to received energy and the effective directive position of said directional antenna, and switch means for alternatively coupling said beacon indicator and said direction finder indicator to the output of said receiver.

12. A radio beacon system comprising a directive radiator means, a transmitter operative on a carrier frequency within the range between 40 and 150 kilocycles per second, means for cyclically producing more than two changes in the directive pattern of said directive radiator means in a given sector, said last named means operative to produce essential side band variations substantially within a band of ±80 cycles per second, a receiver for receiving said transmitted energy, adjustable timing means for selecting predetermined portions of said received energy corresponding to a desired pair of patterns, and means for comparing said selected portions to provide an indication of the location of said receiver relative to said beacon.

13. A radio beacon system comprising means for cyclically radiating energy in more than two differently directed overlapping radiation patterns, whereby ratios of energy level of the different radiation patterns differ with changes in azimuth about the center of radiation of the beacon, means for transmitting an omnidirectional timing pulse at a fixed time during each cycle of said directive radiation, receiver means for receiving the radiated energy from said beacon, means for selecting received energy from two of said radiation patterns, and means responsive to said received timing pulse for controlling said selecting means.

14. A radio beacon system comprising a pair of antennas spaced apart substantially one half a wavelength at the operating carrier frequency, a source of carrier frequency, said carrier frequency being within a band between 40 and 150 kilocycles per second, means for cyclically varying the relative phasing of energy supplied to said two antennas from said source in 90° steps from zero to 270° to provide more than two directive patterns in a given sector, means for providing intermediate the cycles of said energization an omnidirectional synchronizing radiation, said variation in relative phasing and said single energization occurring relatively slowly to limit essential side band variations to a value below ±80 cycles per second, means for receiving the energy transmitted from said beacon, means for selecting said synchronizing radiation from said received energy, means controlled by said selected synchronizing signal for selecting predetermined portions of the received energy from two of said directive patterns, and means for comparing said selected portions.

15. A radio receiver for responding to radio energy of a predetermined frequency having a cyclic character and including a synchronizing signal and energy of different energy levels at different time intervals, comprising means for receiving said energy, a principal gate circuit, a detector for detecting energy passing said gate circuit, adjustable gate circuit control means timed with respect to the synchronizing signal for controlling said gate to permit passage of energy corresponding to selected portions of said received energy corresponding to two different energy levels, switching means timed with said received synchronizing pulses for switching the detected selected energies of different energy levels to different output lines, and means coupled to said output lines to compare the amplitudes of said energies.

16. A receiver according to claim 15 further comprising a direction finder antenna, a direction indicator, and means for coupling said direction finder antenna and said direction indicator to the input and output respectively of said energy receiving means.

17. A radio receiver for responding to radio energy of a predetermined frequency having a cyclic character and including a synchronizing signal and energy of different energy levels at different time intervals, comprising means for receiving said energy, a principal gate circuit, a detector for detecting energy passing said gate circuit, adjustable gate circuit control means, comprising means for selecting said synchronizing signal, adjustable means for producing gate control signals in response to said selecting means, means for applying said gate control signals to said gate circuit to permit passage of energy corresponding to selected portions of said received energy corresponding to two different energy levels, switching means timed with said received synchronizing pulses for switching the detected selected energies of different energy levels to different output lines, and means coupled to said output lines to compare the amplitudes of said energies.

18. A radio receiver for responding to radio energy of a predetermined frequency having a cyclic character and including a synchronizing signal and energy of different energy levels at different time intervals, comprising means for receiving said energy, a principal gate circuit, a detector for detecting energy passing said gate circuit, adjustable gate circuit control means timed with respect to the synchronizing signal for controlling said gate to permit passage of energy corresponding to selected portions of said received energy corresponding to two different energy levels, switching means comprising means for selecting said synchronizing pulse, adjustable means responsive to said selected synchronizing pulse for producing switch control pulses timed with corresponding passed portions of said energy, means controlled by said switching pulses for switching the detected selected energies of different energy levels to different output lines, and means coupled to said output lines to compare the amplitudes of said energies.

19. A radio receiver for responding to radio energy of a predetermined frequency having a cyclic character and including a synchronizing signal and energy of different energy levels at different time intervals, comprising means for receiving said energy, means for selecting said synchronizing signal, a principal gate circuit, a detector for detecting energy passing said gate circuit, adjustable gate circuit control means comprising means for producing a sine wave synchronized with said selected synchronizing pulses, phasing means for adjusting the time position of said sine wave, means for producing gate control pulses in response to said sine wave and means for applying said gate control signals to said gate circuit to permit passage of energy corresponding to selected portions of said received energy corresponding to two different energy levels, switching means comprising means for producing switch control pulses in response to said sine wave, and means controlled by said switching pulses for switching the detected selected energies of different energy levels to different output lines, and means coupled to said output lines to compare the amplitudes of said energies.

20. A radio receiver for responding to radio energy of a predetermined frequency having a cyclic character and including a synchronizing signal and energy of different energy levels at different time intervals, comprising means for receiving said energy, a principal gate circuit, a detector for detecting energy passing said gate circuit, adjustable gate circuit control means timed with respect to the synchronizing signal for controlling said gate to permit passage of energy corresponding to selected portions of said received energy corresponding to two different energy levels, switching means timed with said received synchronizing pulses for switching the detected selected energies of different energy levels to different output lines, means coupled to said output lines to compare the amplitudes of said energies, and adjustable attenuator means in one of said output lines whereby said signals may be adjusted to equality.

21. A receiver according to claim 20, further comprising reversing switch means in said output lines whereby the received energy portions of greater amplitude are passed through the said attenuator.

22. A receiver according to claim 20, further comprising a visual display indicator, a sweep circuit for said indicator timed with said signal cycle, and means for coupling the output of said detector to said visual indicator to provide a visual display of the received signals.

23. A radio receiver according to claim 20, further comprising manual switch means for simultaneously adjusting said gate control circuit to select two other portions of said received energy, and to couple said output lines to the signal comparison means independently of said attenuator.

24. A radio beacon system, comprising a directive radio beacon, means for cyclically shifting the directive pattern of said beacon to provide energy at different levels and ratios in different azimuthal directions about said beacon, means for transmitting a synchronizing signal once for each cycle of said beacon, means for receiving said energy, a principal gate circuit, a detector for detecting energy passing said gate circuit, adjustable gate circuit control means timed with respect to the synchronizing signal for controlling said gate to permit passage of energy corresponding to selected portions of said received energy corresponding to two different energy levels, switching means timed with said received synchronizing pulses for switching the detected selected energies of different energy levels to different output lines, and means coupled to said output lines to compare the amplitudes of said energies to indicate the azimuthal position of said receiver.

25. A radio beacon system comprising a directive radio beacon transmitting energy on a radio frequency under 200 kilocycles per second, cyclic operating means for providing at least four changes in the directivity of said beacon over a cycle of about one second, means for providing a synchronizing signal change in said pattern once per cycle, the signal change and the cyclic variations being such as to retain the side band variations of said radio frequency within a value under 100 cycles per second, means for receiving said energy within a band of 8 cycles per second on either side of said radio frequency, a principal gate circuit, a detector for detecting energy passing said gate circuit, adjustable gate circuit control means timed with respect to the synchronizing signal for controlling said gate to permit passage of energy corresponding to selected portions of said received energy corresponding to two different directive patterns of said beacon, switching means timed with said received synchronizing pulses for switching the detected selected energies of the different directive patterns to different output lines, and means coupled to said output lines to compare the amplitudes of said energies to indicate the azimuthal position of said receiver with respect to said beacon.

26. A system according to claim 25, further comprising adjustable attenuation means in one of said output lines, and means for applying said selected energy portions to said lines in such relation that the greater amplitude portions of said received energy are fed to the comparison means over said attenuation means whereby the amplitudes may be adjusted to equality.

27. A system according to claim 25, further comprising adjustable attenuation means in one of said output lines, means for applying said selected energy portions to said lines in such relation that the greater amplitude portions of said received energy are fed to the comparison means over said attenuation means whereby the amplitudes may be adjusted to equality, and switch means for selecting portions of energy from two other directive patterns and applying them to the signal comparison means to indicate the sector in which said azimuthal position lies.

HENRI G. BUSIGNIES.
PAUL R. ADAMS.
ROBERT I. COLIN.

REFERENCES CITED

The following references are of record in the file of this patent:

UNITED STATES PATENTS

| Number | Name | Date |
|---|---|---|
| 1,667,792 | Martin | May 1, 1928 |
| 2,046,850 | Runge | July 7, 1936 |
| 2,094,333 | Smith | Sept. 28, 1937 |
| 2,142,648 | Linder | Jan. 3, 1939 |
| 2,184,843 | Kramer | Dec. 26, 1939 |
| 2,406,800 | Busignies | Sept. 3, 1946 |
| 2,407,324 | O'Brien | Sept. 10, 1946 |
| 2,436,796 | De Rosa | Mar. 2, 1948 |

FOREIGN PATENTS

| Number | Country | Date |
|---|---|---|
| 652,476 | Germany | Nov. 1, 1937 |
| 661,281 | Germany | June 15, 1938 |